B. B. FARNHAM.
MIXING MACHINE.
APPLICATION FILED NOV. 11, 1913.
1,105,555.
Patented July 28, 1914.
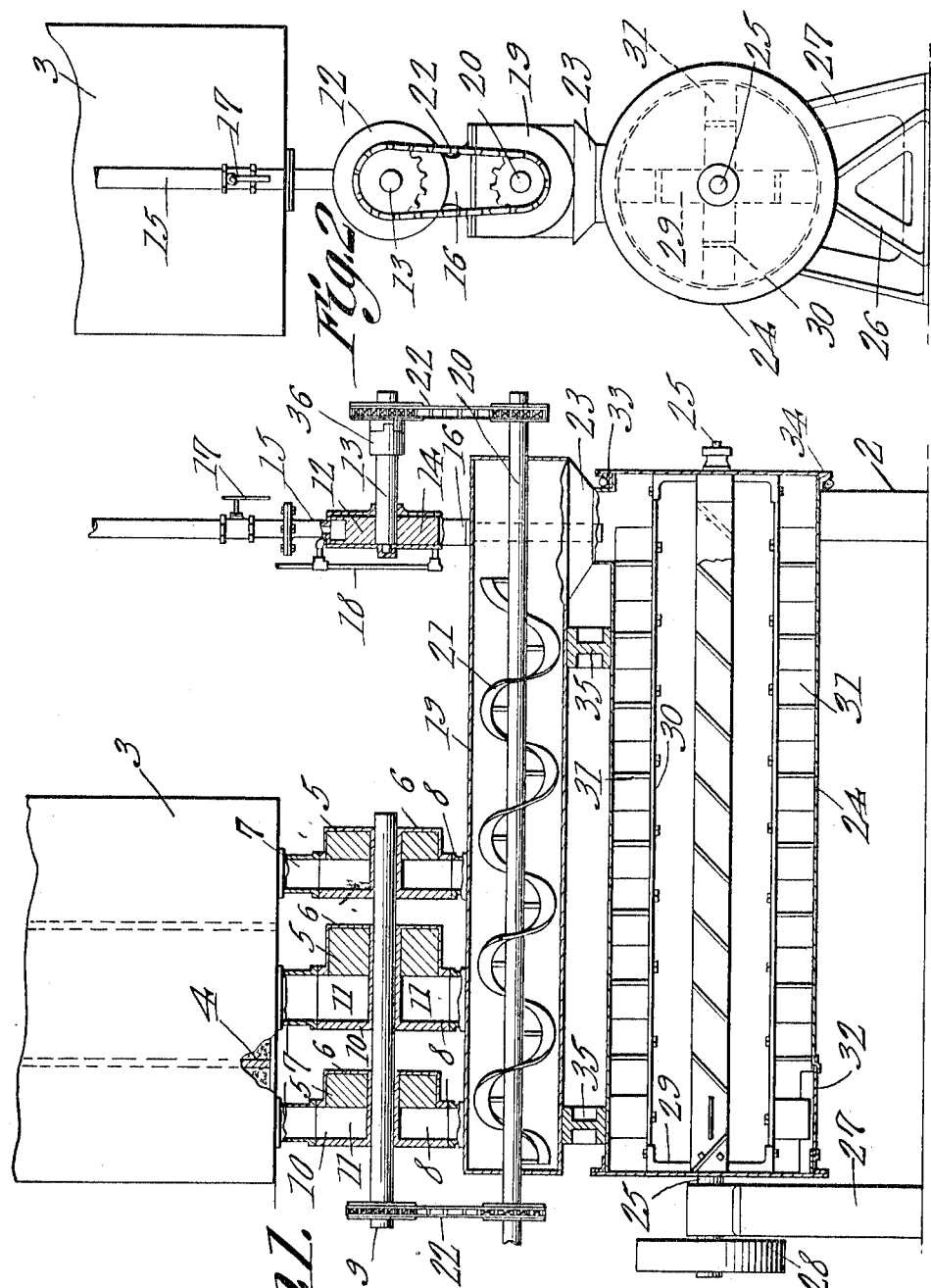

UNITED STATES PATENT OFFICE.

BION B. FARNHAM, OF BUFFALO, NEW YORK.

MIXING-MACHINE.

1,105,555.  Specification of Letters Patent.  Patented July 28, 1914.

Application filed November 11, 1913. Serial No. 800,357.

*To all whom it may concern:*

Be it known that I, BION B. FARNHAM, a citizen of the United States, residing at Buffalo, in the county of Erie and State of New York, have invented a new and useful Mixing-Machine, of which the following is a specification.

This invention relates to a mixing machine.

An object of the present invention is to provide a machine which will mix different kind of grains in certain and definite proportions.

A further object is to provide a machine which will mix grains in definite proportions and will supply to the grain so mixed a definite amount of liquid such as molasses and will agitate and thoroughly mix the heterogeneous mass to substantially uniform constituency.

A further object is to provide an apparatus including a number of positive feed supply valves which are adapted to measure certain quantities of grain or allied material in a given time, to thoroughly mix the grain, and to provide a liquid measuring valve which will supply a predetermined amount of liquid to the aforementioned mixture and to provide a mixer which will thoroughly agitate the heterogeneous mass and deliver the same at a substantially uniform rate.

A further object is to provide an apparatus of the class above mentioned which includes a mixing chamber with a plurality of angularly disposed plates therein and which contact with the inner periphery thereof so that there will be no likelihood of the material building up and caking on the side walls of the mixing chamber. For the above mentioned reasons also the spiders are provided in the end walls of the mixing chamber and take the place of the usual shaft, the spiders contacting with the end walls maintain the same in a plane and free condition.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is disclosed, wherein:—

Figure 1 is a side view in elevation with parts thereof broken away, illustrating my improved mixing machine. Fig. 2 is an end view thereof.

Referring to the drawings in which similar reference numerals designate corresponding parts throughout the several views, 3 is a storage bin for grain or allied material and which is provided with a plurality of compartments therein defined by the partitions 4. Mounted beneath the bins, supporting the same and communicating therewith are the positive feed supply valves 5 which are formed with a casing 6 which has the inlet 7 and outlet 8 communicating therewith. A shaft 9 extends through the valves and is provided with the measuring rotors 10 which rotate within the casing and are provided with the buckets or compartments 11 which come in alinement with the inlet 7 and convey a certain definite quantity of material around the casing and deliver the same to the outlets 8. A somewhat similar valve is illustrated at 12, which valve however is for the supplying of a certain quantity of liquid and in addition the shaft 13 and rotor 14 includes an inlet liquid supply pipe 15 and outlet 16. A valve 17 is positioned within the liquid supply pipe and is used to close the pipe during the non-use of the apparatus. A vent pipe 18 communicates with the casing at its upper and lower extremities adjacent the inlet and outlet thereof so that the liquid will flow freely into the compartments of the rotor and will flow as readily therefrom.

A casing 19 is provided with a shaft 20 extending axially therethrough and upon which is mounted the worm conveyer 21. The casing 19 supports the valves 5 and 12 thereabove which communicate therewith. Positive driving means 22 extend between the shafts 9, 13 and 20 so that a predetermined ratio may be had between the amount of grain fed by the valves 5 and the quantity of liquid supplied by the valve 12. The conveyer casing 19 is provided at its front end with a hopper 23 through which the mixture of grains and liquid pass.

The heterogeneous mass of mixture passes through the hopper 23 down into a mixer which includes the casing 24, cylindrical in outline, and rotatably secured to the ends of which are the stub shafts 25. One extremity of the mixer casing is supported by the post or beam 26 by which the entire device is anchored to the ground and the mixer casing is held against rotation. The remote extremity of the mixer casing 24 is supported by the stub shaft 25 which is journaled within the post bearing 27. A pulley wheel 28 is secured to this stub shaft and is adapted to impart rotation thereto from some suitable source of power, not illustrated. The stub shafts 25 extend through the casing ends and have the spiders 29 rigidly secured thereto which are adapted to rotate therewith. Bars 30 extend between the outstanding legs of the spiders and to which bars are secured the angularly disposed mixing plates 31 which are adapted to move the contents of the mixing chamber from one end to the other to thoroughly agitate and mix the same to thereby produce a mixture of practically uniform constituency. In this connection it is to be noted that the ends of the agitating plates 31 contact with the inner peripheral surface of the casing 24 so that there will be no likelihood of the material caking upon the side walls of the casing which would obstruct the free working of the apparatus. Also mention is made of the fact that in some instances a single row of the plates 31 may be turned in the opposite direction so that they will force the mixture in a reverse direction, it being noted that the majority of plates however will be turned so that the mixture will be gradually worked toward the outlet end of the mixing chamber. This is illustrated in Fig. 1 of the drawings in which the lowermost one of the plates 31 is inclined at a different angle and in the opposite direction than the two upper rows of plates. The lower portion of the mixing casing and at the end remote from the hopper 23 is provided with the outlet door 32 through which the thoroughly agitated mixture passes. The end of the mixer casing adjacent the hopper 23 is hingedly secured to the said casing as at 33, there being a suitable latch 34 to hold the same against accidental detachment. The end of the casing may swing about the hinge 33 without hindrance from the stub shaft 25 by reason of the fact that the bearing between the stub shaft 25 and the said end is of limited length to allow the operation to take place as described.

The beams 35 extend between the mixer casing and the conveyer casing for the supporting of the latter and to insure that the entire machine will be of rigid and strong construction. The machine herein disclosed is intended to be used with grains which are to be coated or covered with molasses although it is to be understood that it may be used for other purposes with equally efficient results. The gear ratio between the shafts 9, 13 and 20 may be varied so that the final mixture may contain the various ingredients in any desired proportions, the above holding true also with respect to the amount of molasses or liquid supplied through the valve 12. The shaft 13 of the valve 12 is provided with the clutch 36 so that the said valve may be temporarily stopped should it be apparent that the mixture contains a too high percentage of the molasses or liquid. The material within the bin 3, usually grain or other similar material, is fed down through the positive feeding valves 5. The size of the buckets of the valves may be changed so that any desired valves may be changed so that any desired mixture of the grains can be obtained. The grains pass down into the conveyer casing 19 along which they are moved and agitated so that a thorough mixing thereof is had and which mixture passes into the hopper 23 located directly beneath the molasses supplying-valve 12. The buckets of the rotor of the valve 12 may also be changed so that the quantity of liquid or molasses may be varied or the relative speeds of rotation of the valves 13 and 5 may be varied to produce a like result. The mixture of grains and molasses passes down into the mixing casing or chamber 24 wherein it is thoroughly agitated and gradually moved from one end of the casing to the other and in which procedure the grains become thoroughly coated with the molasses.

Having thus fully described my invention, what I claim is:—

1. A mixing machine comprising a mixing chamber, said mixing chamber provided with longitudinally extending rows of angularly disposed rotatable plates, the majority of the rows provided with the plates inclined in one direction, and the remaining rows provided with the plates inclined in the other direction, to thoroughly agitate the mass within the mixing chamber and to accomplish its gradual but interrupted transportation from one end of the chamber to the other.

2. A mixing machine comprising a mixing chamber, means for delivering material to be mixed thereto, said mixing chamber provided with stub shafts extending in the end walls thereof, spiders carried by said stub shafts and arranged interiorly of said mixing chamber, longitudinally extending beams secured to the extremities of said spiders, angularly disposed plates carried by said beams and adapted to agitate the material in contact therewith.

3. A mixing machine comprising a mixing chamber, means for delivering material to be mixed thereto, said mixing chamber provided with stub shafts extending in the end walls thereof, spiders carried by said stub shafts and arranged interiorly of said mixing chamber, longitudinally extending beams secured to the extremities of said spiders, angularly disposed plates carried by said beams and adapted to agitate the material in contact therewith, and the majority of said plates inclined to force the material in contact therewith in one direction, and the minority of said plates inclined in the opposite direction to move the material in contact therewith in the opposite direction.

4. A mixing machine comprising a plurality of positively driven measuring valves, means for feeding dry solids thereto, a conveying and mixing chamber disposed beneath and communicating with said valves adapted to intermix the various solids discharged from said valves while in a dry state, and a liquid measuring and discharge valve adapted to supply a liquid to the mixed solids after the same have traversed the said conveying and mixing chamber.

5. A mixing machine comprising a plurality of independent bins adapted to receive solid material therein, a plurality of positively driven measuring valves communicating with said bins, a conveying and mixing chamber disposed beneath and communicating with said valves adapted to thoroughly intermix the solids discharged from said measuring valves, and a liquid discharge valve positively driven in a definite gear ratio with the solid measuring valves and adapted to discharge a liquid to the mixed mass of solids.

6. A mixing machine comprising a plurality of measuring valves adapted to discharge solids therefrom, a conveying chamber adapted to intermix the mass of solids during the transportation therethrough, a mixing chamber disposed beneath and communicating at one end with the said conveying chamber, and a liquid discharge valve adapted to discharge liquid into the said mixing chamber, the said conveying chamber adapted to discharge the mixed mass of solids into the mixing chamber to receive the liquid directly upon its entry within said mixing chamber.

7. A mixing chamber comprising a plurality of measuring valves adapted to discharge solids therefrom, a conveying chamber adapted to intermix the mass of solids during the transportation therethrough, a mixing chamber disposed beneath and communicating at one end with the said conveying chamber, a liquid discharge valve adapted to discharge liquid into the said mixing chamber, the said conveying chamber adapted to discharge the mixed mass of solids into the mixing chamber to receive the liquid directly upon its entry within said mixing chamber, and a mixing chamber adapted to receive the mixed mass of solids therein and the said liquid for the thorough mixing of the same to form a mass of substantially uniform constituency.

In testimony that I claim the foregoing as my own, I have hereto affixed my signature in the presence of two witnesses.

BION B. FARNHAM.

Witnesses:
 RICHARD N. TEMPLETON,
 ORSON J. HEIMET.

---

Copies of this patent may be obtained for five cents each, by addressing the "Commissioner of Patents, Washington, D. C."